(12) United States Patent
Tsai

(10) Patent No.: US 12,386,439 B2
(45) Date of Patent: Aug. 12, 2025

(54) ROLLER INPUT DEVICE

(71) Applicant: Chicony Electronics Co., Ltd., New Taipei (TW)

(72) Inventor: Ho-Chin Tsai, New Taipei (TW)

(73) Assignee: CHICONY ELECTRONICS CO., LTD., New Taipei (TW)

( * ) Notice: Subject to any disclaimer, the term of this patent is extended or adjusted under 35 U.S.C. 154(b) by 0 days.

(21) Appl. No.: 18/667,649

(22) Filed: May 17, 2024

(65) Prior Publication Data

US 2024/0385706 A1 Nov. 21, 2024

Related U.S. Application Data

(60) Provisional application No. 63/467,604, filed on May 19, 2023.

(30) Foreign Application Priority Data

Jul. 12, 2023 (TW) .................................. 112126085

(51) Int. Cl.
*G06F 3/0362* (2013.01)
(52) U.S. Cl.
CPC ................................. *G06F 3/0362* (2013.01)
(58) Field of Classification Search
CPC .................................................. G06F 3/0362
See application file for complete search history.

(56) References Cited

U.S. PATENT DOCUMENTS

| 7,733,328 B2 * | 6/2010 | Blandin | G06F 3/0362 |
| | | | 345/163 |
| 11,567,591 B1 * | 1/2023 | Su | G06F 3/03543 |

* cited by examiner

*Primary Examiner* — Matthew A Eason
*Assistant Examiner* — Scott D Au
(74) *Attorney, Agent, or Firm* — MUNCY, GEISSLER, OLDS & LOWE, P.C.

(57) ABSTRACT

A roller input device includes a base, a roller, a magnetic assembly, and a magnetic-conductive element. The roller is rotatably disposed on the base and includes a main body and magnetic protrusions arranged around a peripheral portion of the main body. The magnetic assembly is disposed on one side of the base and includes an electromagnet and a permanent magnet. The electromagnet includes a coil. The magnetic-conductive element is disposed on the base and between the roller and the magnetic assembly, and a side surface of the magnetic-conductive element facing the roller has a convex portion. When the electromagnet is in a first mode, the coil conducts a forward current, so that the magnetic-conductive element is magnetized to have a magnetic property. When the electromagnet is in a second mode, the coil conducts a reverse current, so that the magnetic-conductive element does not have the magnetic property.

14 Claims, 9 Drawing Sheets

ROLLER INPUT DEVICE

CROSS-REFERENCES TO RELATED APPLICATIONS

This application claims the benefit of U.S. provisional application Ser. No. 63/467,604, filed on May 19, 2023 and claims the priority of patent application No. 112126085 filed in Taiwan, R.O.C. on Jul. 12, 2023. The entirety of the above-mentioned patent applications are hereby incorporated by references herein and made a part of the specification.

BACKGROUND

Technical Field

The instant disclosure relates to an input device, in particular, to a roller input device.

Related Art

Commonly, computers are used along with roller input devices. For example, the roller input device may be provided on a keyboard or a mouse, and the user can use the roller input device to perform actions, such as dragging item(s), scrolling pages, or switching menu(s).

SUMMARY

A roller input device known to the inventor includes a roller and an elastic member, wherein the main body of the roller has a toothed surface, and the elastic member abuts against the toothed surface of the main body of the roller. Therefore, when the roller is operated so as to be rotated, the user will have a stepped operation feeling. For example, every time the roller is rotated with a certain scale, the user will feel the roller is temporary stopped, and the page shown on the monitor is scrolled by a preset distance. However, such mechanical roller input device is not sufficient to meet some operation scenarios (such as the user has to operate the roller for a long time or for a long distance, or the user has to allow the roller to perform a more finely scroll operation).

In view of this, in one embodiment, a roller input device is provided. The roller input device comprises a base, a roller, a magnetic assembly, and a magnetic-conductive element. The roller is rotatably disposed on the base. The roller comprises a main body and a plurality of magnetic protrusions, the magnetic protrusions are arranged around a peripheral portion of the main body, and the magnetic protrusions are spaced apart from each other. The magnetic assembly is disposed on one side of the base. The magnetic assembly comprises an electromagnet and a permanent magnet stacked with the electromagnet. The electromagnet comprises a coil, a first magnetic pole, and a second magnetic pole opposite to the first magnetic pole, and the electromagnet is selectively switched between a first mode and a second mode. The permanent magnet comprises a third magnetic pole and a fourth magnetic pole opposite to the third magnetic pole. The magnetic-conductive element is disposed on the base. The magnetic-conductive element is between the roller and the magnetic assembly, and the first magnetic pole of the electromagnet and the third magnetic pole of the permanent magnet are adjacent to the magnetic-conductive element. The magnetic-conductive element has a side surface facing the roller, the side surface has a convex portion, and the convex portion is adjacent to an outer periphery of the roller but does not contact the magnetic protrusions. When the electromagnet is in the first mode, the coil conducts a forward current, so that the magnetic-conductive element is magnetized to have a magnetic property. When the electromagnet is in the second mode, the coil conducts a reverse current, so that the magnetic-conductive element does not have the magnetic property.

In some embodiments, when the electromagnet is in the first mode, the first magnetic pole and the third magnetic pole are poles with a same polarity, and the second magnetic pole and the fourth magnetic pole are poles with a same polarity; when the electromagnet is in the second mode, the first magnetic pole and the third magnetic pole are poles with opposite polarities, and the second magnetic pole and the fourth magnetic pole are poles with opposite polarities.

In some embodiments, a notch is between each two adjacent magnetic protrusions among the magnetic protrusions; when the electromagnet is in the first mode and a position of the convex portion corresponds to a corresponding one of the magnetic protrusions, a magnetic attraction force is between the convex portion and the corresponding one of the magnetic protrusions; when the electromagnet is in the first mode and the position of the convex portion corresponds to the notch, the magnetic attraction force is not between the convex portion and each of the magnetic protrusions.

In some embodiments, the roller input device further comprising a control switch, wherein the control switch is connected to the electromagnet; when the electromagnet is in the first mode, the control switch is capable of optionally adjusting a magnitude of the forward current.

In some embodiments, the roller input device further comprising a toggle switch, wherein the toggle switch is connected to the electromagnet, and the toggle switch is capable of selectively toggling the coil to conduct the forward current or the reverse current.

In some embodiments, the side surface of the magnetic-conductive element is an arced surface, the side surface of the magnetic-conductive element comprises a plurality of the convex portions, and the convex portions are spaced apart from each other.

In some embodiments, a mount extends from the side of the base, and the magnetic assembly is fixed on the mount.

In some embodiments, an insertion groove is at the side of the base, and one end of the electromagnet is inserted and fixed into the insertion groove.

In some embodiments, an insulation seat is disposed on the mount, the insulation seat has a receiving groove, the electromagnet is fixed on the insulation seat, and the permanent magnet is received in the receiving groove.

In some embodiments, the roller input device further comprising another magnetic-conductive element, wherein the another magnetic-conductive element is fixed on the mount, and the magnetic-conductive element and the another magnetic-conductive element are respectively at two opposite ends of the magnetic assembly.

In some embodiments, a limiting post further extends from the side of the base, an end portion of the limiting post is fixed on the another magnetic-conductive element, and the magnetic assembly is between the limiting post and the mount.

In some embodiments, the peripheral portion of the main body of the roller has a ring-shaped groove, and a ring-shaped washer is disposed in the ring-shaped groove.

In some embodiments, the base has a groove, the magnetic-conductive element is detachably fixed in the groove, and a portion of the roller is in the groove.

In some embodiments, the main body is made of a plastic material.

Based on the above, in the roller input device according to one or some embodiments of the instant disclosure, when the electromagnet is switched to the first mode, the coil conducts the forward current so that the magnetic-conductive element is magnetized to have a magnetic property. Therefore, a change of magnetic attraction forces can be provided between the magnetic-conductive element and the magnetic protrusions, and the user will have a stepped operation feeling upon rotating the roller. When the electromagnet is switched to the second mode, the coil conducts a reverse current so that the magnetic-conductive element does not have the magnetic property. Therefore, upon the user rotates the roller, the roller can be rotated quickly or can perform a finely operation without having an excessive resistance. Hence, according to one or some embodiments of the instant disclosure, the roller input device can be provided for meeting certain operation conditions (such as the user has to operate the roller for a long time or for a long distance, or the user has to allow the roller to perform a more finely scroll operation).

BRIEF DESCRIPTION OF THE DRAWINGS

The disclosure will become more fully understood from the detailed description given herein below for illustration only, and thus not limitative of the disclosure, wherein.

DETAILED DESCRIPTION

Figure 1:
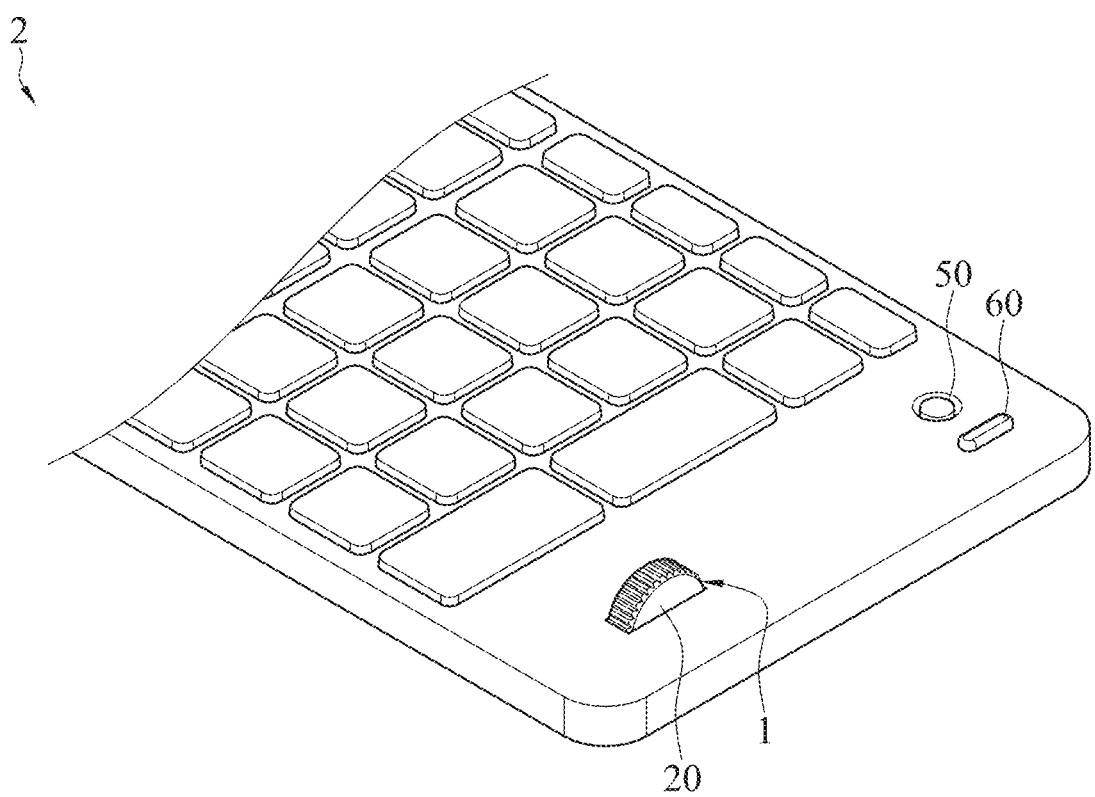
FIG. 1 illustrates a schematic view showing the operation of a roller input device according to an exemplary embodiment of the instant disclosure.
Figure 2:
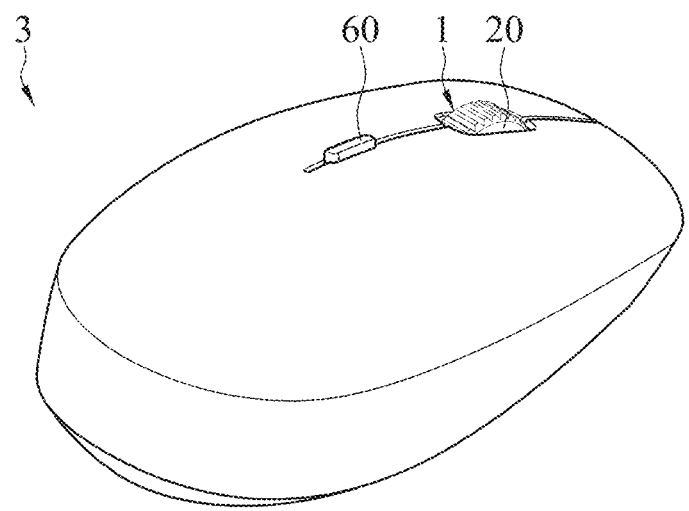
FIG. 2 illustrates a schematic view showing the operation of a roller input device according to another exemplary embodiment of the instant disclosure.
Figure 3:
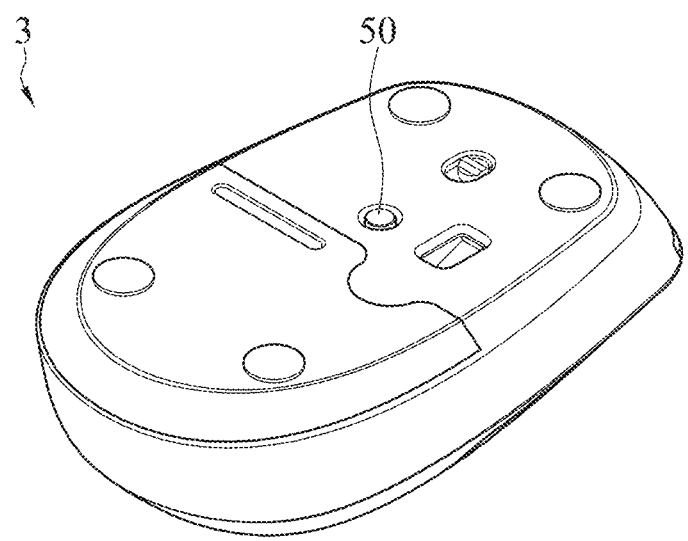
FIG. 3 illustrates a schematic view showing the operation of a roller input device according to yet another exemplary embodiment of the instant disclosure.
Figure 4:
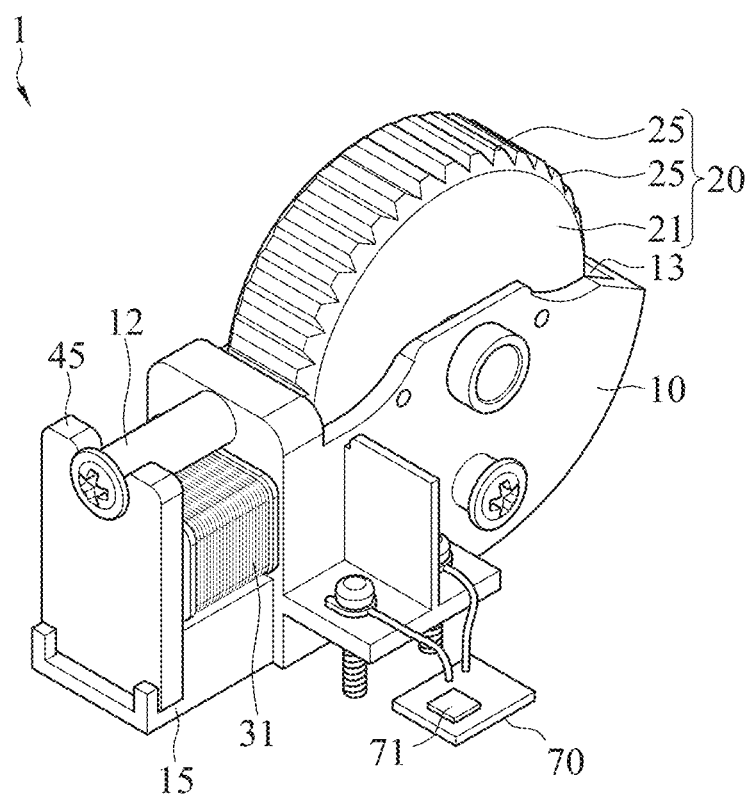
FIG. 4 illustrates a perspective view of a roller input device according to a first embodiment of the instant disclosure.

FIG. 1 illustrates a schematic view showing the operation of a roller input device according to an exemplary embodiment of the instant disclosure. FIG. 2 illustrates a schematic view showing the operation of a roller input device according to another exemplary embodiment of the instant disclosure. FIG. 3 illustrates a schematic view showing the operation of a roller input device according to yet another exemplary embodiment of the instant disclosure. FIG. 4 illustrates a perspective view of a roller input device according to a first embodiment of the instant disclosure. As shown in FIG. 1 to FIG. 4, the roller input device 1 according to the exemplary embodiment of the instant disclosure is an input device of a computer, and the roller input device 1 is adapted to manipulate the page shown on the computer to perform certain actions (such as dragging items, scrolling the page upward or downward, or switching menus). In some embodiments, the roller input device 1 may be applied to a keyboard 2 of the computer (as shown in FIG. 1). Alternatively, in some other embodiments, the roller input device 1 may be applied to a mouse 3 of the computer (as shown in FIG. 2); for example, the roller input device 1 may be assembled in the housing of the keyboard 2 or the housing of the mouse 3.

Figure 5:
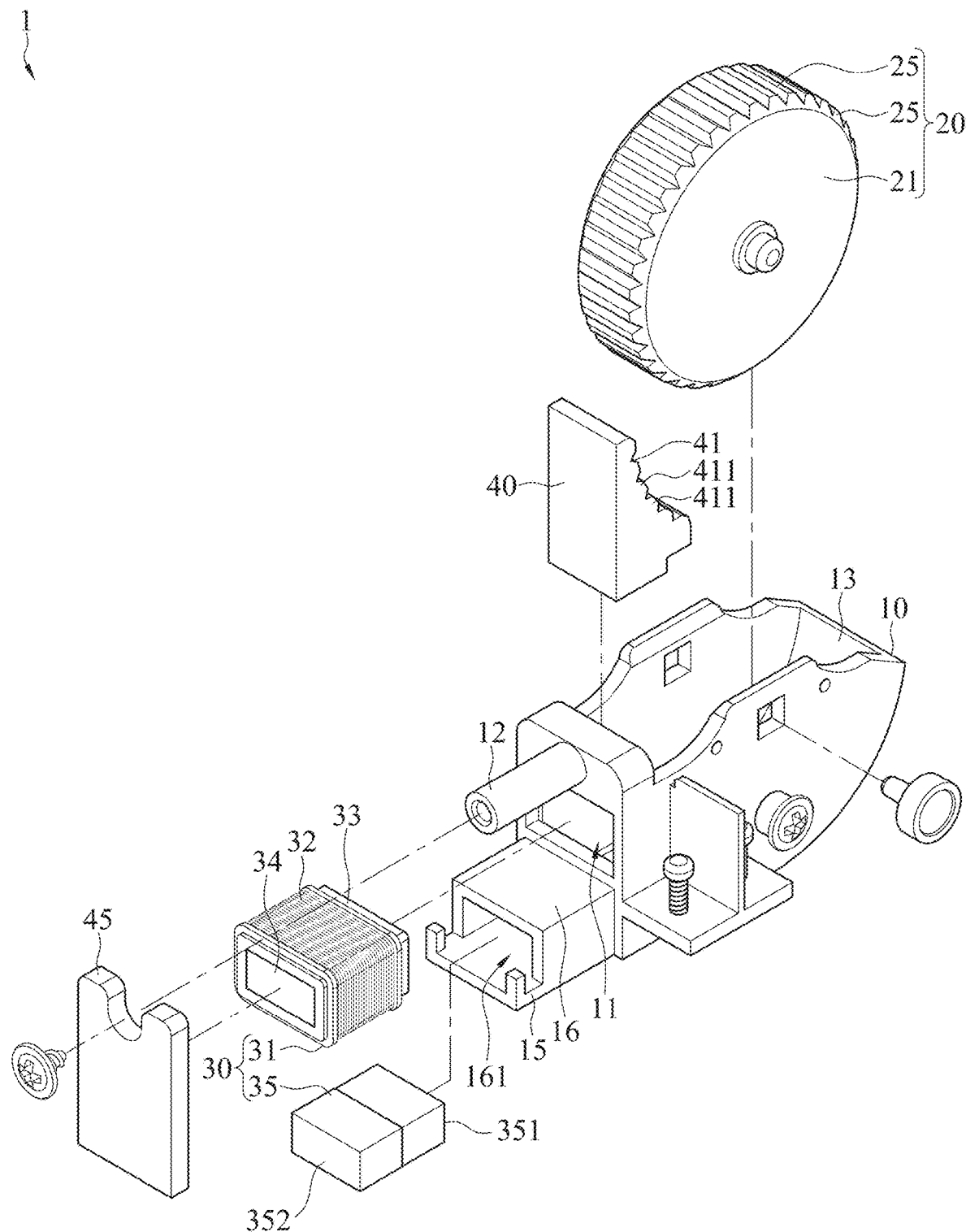
FIG. 5 illustrates an exploded view of the roller input device of the first embodiment.
Figure 6:
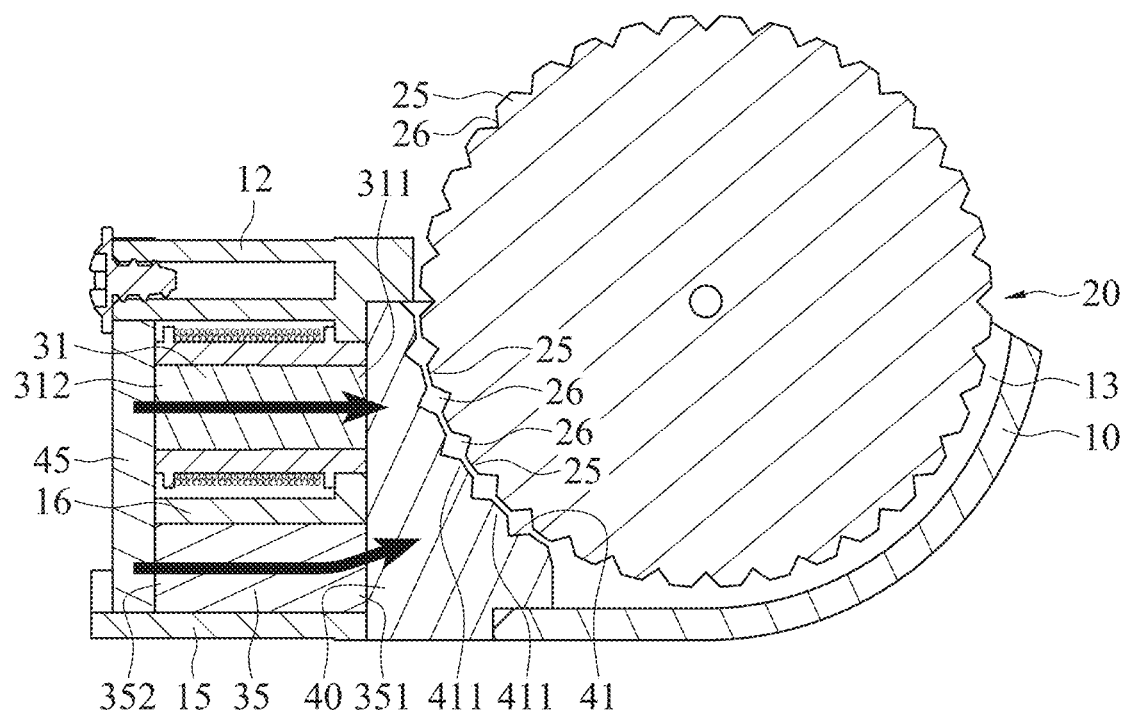
FIG. 6 illustrates a cross-sectional view showing that the electromagnet of the roller input device of the exemplary embodiment is in a first mode.

FIG. 5 illustrates an exploded view of the roller input device of the first embodiment. FIG. 6 illustrates a cross-sectional view showing that the electromagnet of the roller input device of the exemplary embodiment is in a first mode. As shown in FIG. 4 to FIG. 6, the roller input device 1 comprises a base 10, a roller 20, a magnetic assembly 30, and a magnetic-conductive element 40. The roller 20 is rotatably disposed on the base 10. In other words, in this embodiment, when the roller 20 is operated by a user, the roller 20 can be rotated with respect to the base 10.

As shown in FIG. 4 to FIG. 6, in this embodiment, the base 10 is a hollowed housing and has a groove 13. A portion of the roller 20 (in this embodiment, the lower portion) is in the groove 13, and a shaft of the roller 20 is pivotally connected to the base 20. Therefore, when the roller 20 is operated, the roller 20 can be rotated with respect to the base 10. Furthermore, as shown in FIG. 1 and FIG. 2, a portion of the roller (in this embodiment, the upper portion) can be exposed from the housing of the keyboard 2 or the housing of the mouse 3 for user's operation.

As shown in FIG. 4 to FIG. 6, the roller 20 comprises 21 a main body 21 and a plurality of magnetic protrusions 25. Each of the magnetic protrusions 25 is a protruding tooth or a protruding block, and each of the magnetic protrusions 25 is made of iron, cobalt, nickel, silicon steel or other magnetic-conductive materials. The magnetic protrusions 25 are arranged around a peripheral portion of the main body 21, and the magnetic protrusions 25 are spaced apart from each other, so that the roller 20 is formed as a gear structure, and a notch 26 is between each two adjacent magnetic protrusions 25 among the magnetic protrusions 25. In some embodiments, the main body 21 of the roller 20 and the magnetic protrusions 25 are together formed as a one-piece structure or an assembled structure. For example, as shown in FIG. 5, in this embodiment, the main body 21 and the magnetic protrusions 25 are formed as a one-piece structure. Therefore, the manufacturing process of the roller 20 can be simplified and the structural strength of the entire roller 20 can be enhanced.

As shown in FIG. 4 to FIG. 6, the magnetic assembly 30 is disposed on one side of the base 10. In other words, in this embodiment, the magnetic assembly 30 is disposed out of the base 10, rather than in the groove 13 of the base 10. Therefore, the assembling processes of the magnetic assembly 30 and the roller 20 can be performed separately, and the sequence of the assembling processes is not limited, thereby facilitating the assembling process of the roller input device 1. Hence, the roller input device 1 can be manufactured easily, and the size of the roller 20 is not limited by the manufacturing process. Moreover, when one of the magnetic assembly 30 and the roller 20 is to be replaced or repaired, the magnetic assembly 30 and the roller 20 can be detached from the base 10 separately, instead of being together detached from the base 10.

As shown in FIG. 4 to FIG. 6, the magnetic assembly 30 comprises an electromagnet 31 and a permanent magnet 35 stacked with the electromagnet 31. The electromagnet 31 comprises a coil 32, an insulation frame 33, and a magnetic body 34. The magnetic body 34 may be a block made of iron, cobalt, nickel, silicon steel or other magnetic-conductive materials. The insulation frame 33 encloses the magnetic body 34, the coil 32 is wound around the insulation frame 33 to prevent the coil 32 from directly contacting the magnetic body 34, and thus the insulation frame 33 provides an insulation function. Hence, when the coil 32 of the electromagnet 31 conducts currents, a magnetic field is generated correspondingly, so that the two opposite ends of the electromagnet 31 form different magnetic poles. For example, as shown in FIG. 6, in this embodiment, the electromagnet 31 comprises a first magnetic pole 311 and a second magnetic pole 312 opposite to the first magnetic pole 311. When the coil 32 conducts currents, the first magnetic pole 311 and the second magnetic pole 312 respectively form the N pole and the S pole or the S pole and the N pole; the polarities of the magnetic poles are determined according to the direction of the current conducted in the coil 32.

As shown in FIG. 4 to FIG. 6, the permanent magnet 35 of the magnetic assembly 30 may be for example an alnico magnet or an NdFEB magnet which can have the N pole and the S pole with being electrified. For example, in this embodiment, the permanent magnet 35 comprises a third magnetic pole 351 and a fourth magnetic pole 352 opposite to the third magnetic pole 351, and the third magnetic pole 351 and the fourth magnetic pole 352 may be respectively the N pole and the S pole or the S pole and the N pole.

As shown in FIG. 4 to FIG. 6, the magnetic-conductive element 40 may be a block or a plate made of iron, cobalt, nickel, silicon steel or other magnetic-conductive materials. The magnetic-conductive element 40 is disposed on the base 10 and between the roller 20 and the magnetic assembly 30. In this embodiment, the roller 20 and the magnetic assembly 30 are respectively at two opposite sides of the magnetic-conductive element 40. The first magnetic pole 311 of the electromagnet 31 and the third magnetic pole 351 of the permanent magnet 35 are adjacent to and do not contact the magnetic-conductive element 40. Therefore, when the electromagnet 31 and the permanent magnet 35 generate a magnetic field, the magnetic field can have an interaction with respect to the magnetic-conductive element 40. Under this configuration, the second magnetic pole 312 of the electromagnet 31 is farer away from the magnetic-conductive element 40 with respect to the first magnetic pole 311 (in other words, in this embodiment, a distance between the second magnetic pole 312 and the magnetic-conductive element 40 is greater than a distance between the first magnetic pole 311 and the magnetic-conductive element 40), and the fourth magnetic pole 352 of the permanent magnet 35 is farer away from the magnetic-conductive element 40 with respect to the third magnetic pole 351 (in other words, in this embodiment, a distance between the fourth magnetic pole 352 and the magnetic-conductive element 40 is greater than a distance between the third magnetic pole 351 and the magnetic-conductive element 40).

As shown in FIG. 4 to FIG. 6, the magnetic-conductive element 40 has a side surface 41 facing the roller 20, and the side surface 41 has at least one convex portion 411. In this embodiment, the side surface 41 of the magnetic-conductive element 40 is an arced surface to correspond to the curvature of the outer periphery of the roller 20, and the side surface 41 comprises a plurality of convex portions 411. The convex portions 411 are arranged around the arced surface and spaced apart from each other. Moreover, a distance between each two adjacent convex portions 411 is identical to a distance between each two adjacent magnetic protrusions 25. Each of the convex portions 411 is adjacent to the outer periphery of the roller 20 but does not contact the magnetic protrusions 25 of the roller 20.

As shown in FIG. 4 to FIG. 6, the electromagnet 31 is selectively switched between a first mode and a second mode. When the electromagnet 31 is switched to the first mode, the coil 32 conducts a forward current, so that the electromagnet 31 generates the magnetic field, and the magnetic-conductive element 40 is magnetized to have a magnetic property. For example, when the electromagnet 31 is in the first mode, the first magnetic pole 311 of the electromagnet 31 and the third magnetic pole 351 of the permanent magnet 35 are poles with the same polarity (for example, both are N poles), likewise, the second magnetic pole 312 and the fourth magnetic pole 352 are poles with the same polarity (for example, both are S poles). Because the first magnetic pole 311 and the third magnetic pole 352 which are adjacent to the magnetic-conductive element 40 are poles with the same polarity, the magnetic field of the electromagnet 31 and the permanent magnet 35 can be transmitted to the magnetic-conductive element 40 (as indicated by the arrow shown in FIG. 6), so that the magnetic-conductive element 40 is magnetized to have the magnetic property.

Figure 7:
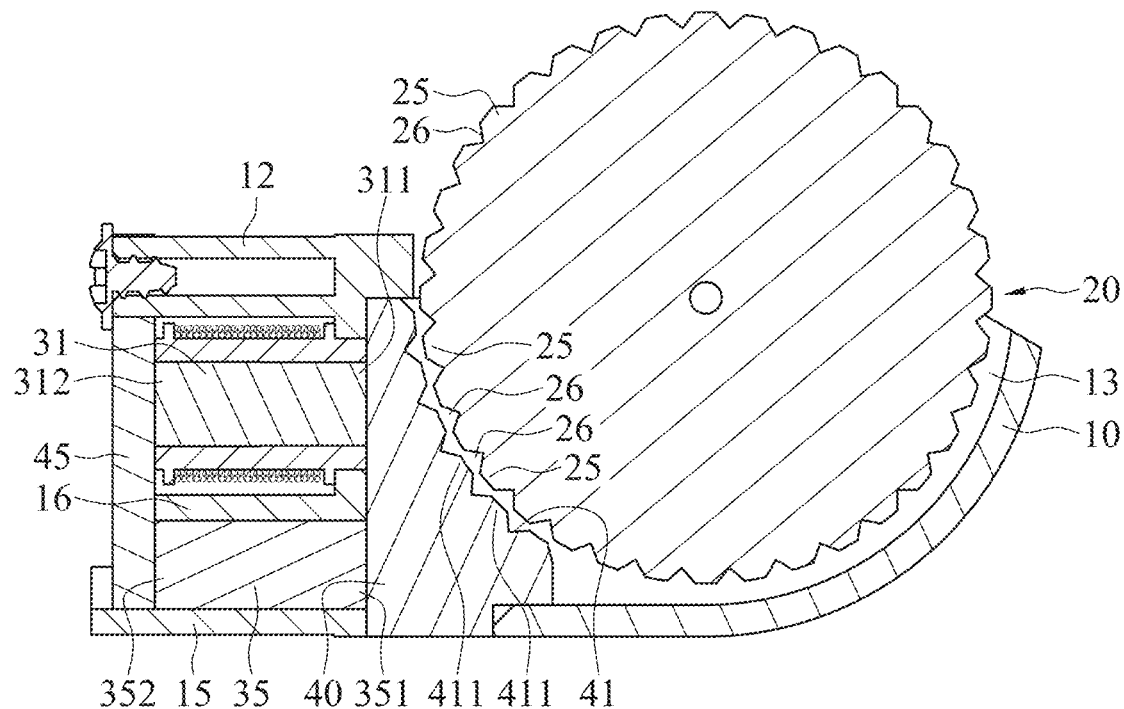
FIG. 7 illustrates another cross-sectional view showing that the electromagnet of the roller input device of the exemplary embodiment is in the first mode.

Next, as shown in FIG. 6 and FIG. 7, when the electromagnet 31 is in the first mode, the magnetic-conductive element 40 has the magnetic property. Therefore, during the process that the user operates the roller 20 to rotate the roller 20, when a position of the convex portions 411 of the magnetic-conductive element 40 corresponds to a position of an adjacent one of the magnetic protrusions 25 (as shown in FIG. 6), a magnetic attraction force is generated between the convex portion 411 and the corresponding magnetic protrusion 25. Hence, the user can have the stepped operation feeling upon rotating the roller 20. Moreover, during the process that the user operates the roller 20 to rotate the roller 20, when the convex portion 411 of the magnetic-conductive element 40 corresponds to an adjacent notch 26 (as shown in FIG. 7), the magnetic attraction force between the convex portion 411 and the magnetic protrusions 25 is greatly reduced or even disappeared. Therefore, during the rotation of the roller 20, changes of the magnetic attraction forces between the convex portion 411 of the magnetic-conductive element 40 and the roller continuously occur, so that the user can have the stepped feeling upon rotating the roller 20. Hence, as compared with a roller input device which adopts the mechanical structure to achieve the stepped operation feeling, according to one or some embodiments of the instant disclosure, the roller input device 1 can achieve the advantages of preventing the mechanical error, reducing the operation noise, and reducing the friction loss.

As shown in FIG. 1, FIG. 3, and FIG. 4, in this embodiment, the roller input device 1 further comprises a control switch 50, and the control switch 50 is connected to the coil 32 of the electromagnet 31 through a microprocessor 71 on a circuit board 70. When the electromagnet 31 is in the first mode, the user can adjust the magnitude of the forward current through the control switch 50. For example, the control switch 50 is a multistage switch. Therefore, when the user switches the control switch 50 to different stages, the microprocessor 71 can control the coil 32 of the electromagnet 31 to conduct currents with different magnitudes so as to generate magnetic fields with different magnitudes correspondingly. Therefore, magnetic attraction forces with different magnitudes can be generated between the magnetic-conductive element 40 and the roller so as to adjust the resistance upon the roller 20 is rotating. Therefore, the user can adjust the operation feeling of the roller 20 through the control switch 50 freely and optionally.

In some embodiments, the control switch 50 may be a physical switch (as shown in FIG. 1 and FIG. 3) and is electrically connected to the microprocessor 71. Alternatively, in some embodiments, the control switch 50 may be a virtual switch and is communicatively connected to the microprocessor 71. For example, the user can execute an application program through a user device (such as a computer, a smart phone, or a tablet computer) to show the virtual control switch 50 on the operation interface for operation.

Figure 8:
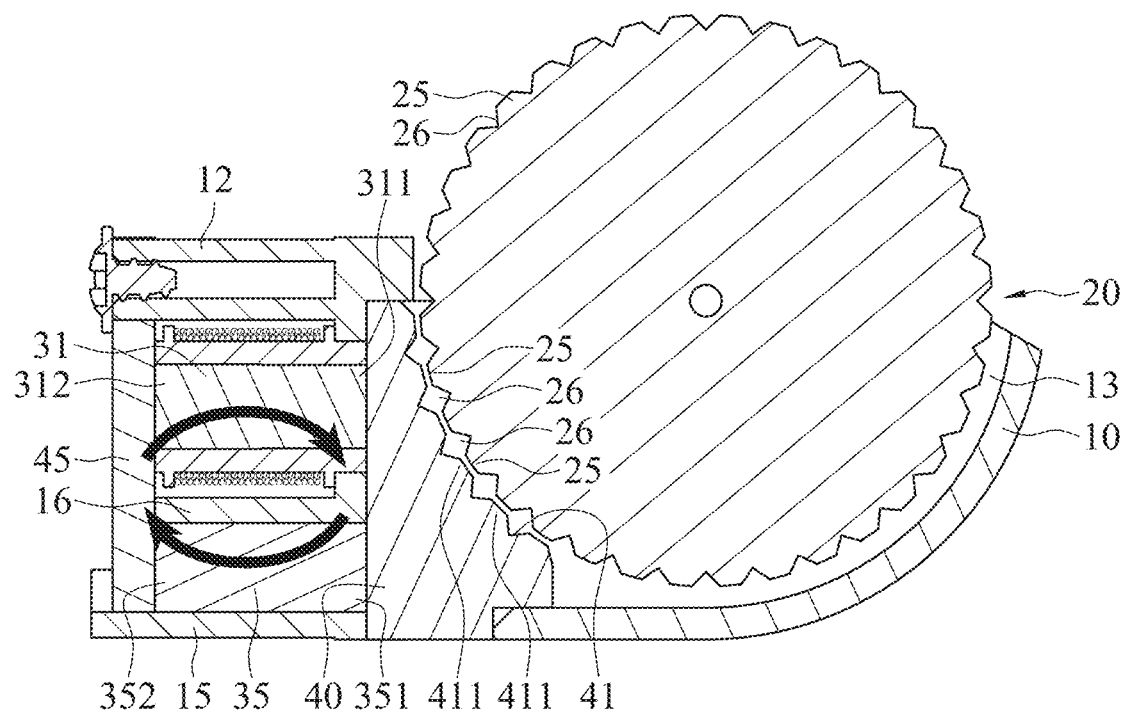
FIG. 8 illustrates a cross-sectional view showing that the electromagnet of the roller input device of the exemplary embodiment is in a second mode.

As shown in FIG. 8, when the electromagnet 31 of the magnetic assembly 30 is switched to the second mode, the coil 32 conducts a reverse current, and the direction of the reverse current is opposite to the direction of the forward current, so that the magnetic field direction of the electromagnet 31 can be changed. For example, supposed that the electromagnet 31 is in the first mode, the first magnetic pole 311 and the second magnetic pole 312 of the electromagnet 31 are respectively the N pole and the S pole, the third magnetic pole 351 and the fourth magnetic pole 352 of the permanent magnet 35 are respectively the N pole and the S pole, and the magnetic field direction of the permanent magnet 35 is unchanged. When the electromagnet 31 is switched to the second mode, the polarities of the first magnetic pole 311 and the second magnetic pole 312 are exchanged, so that the first magnetic pole 311 of the electromagnet 31 and the third magnetic pole 351 become poles with opposite polarities (that is, in this embodiment, the first magnetic pole 311 is changed from N pole to S pole, while the third magnetic pole 351 is retained as N pole). Likewise, the second magnetic pole 312 and the fourth magnetic pole 352 become poles with opposite polarities (that is, in this embodiment, the second magnetic pole 312 is changed from S pole to N pole, while the fourth magnetic pole 352 is retained as S pole). Based on the change of the magnetic field direction, the magnetic field generated by the electromagnet 31 and the permanent magnet 35 is formed as an enclosed loop (as indicated by the arrow shown in FIG. 8) and is not transmitted to the magnetic-conductive element, so that the magnetic-conductive element 40 is not magnetized and thus does not have the magnetic property. Therefore, during the process that the user rotates the roller 20 to rotate, the roller 20 can be rotated quickly or can perform a finely operation without having an excessive resistance. Hence, according to one or some embodiments of the instant disclosure, the roller input device 1 can be provided for meeting certain operation conditions (such as the user has to operate the roller 20 for a long time or for a long distance, or the user has to allow the roller 20 to perform a more finely scroll operation).

Figure 9:
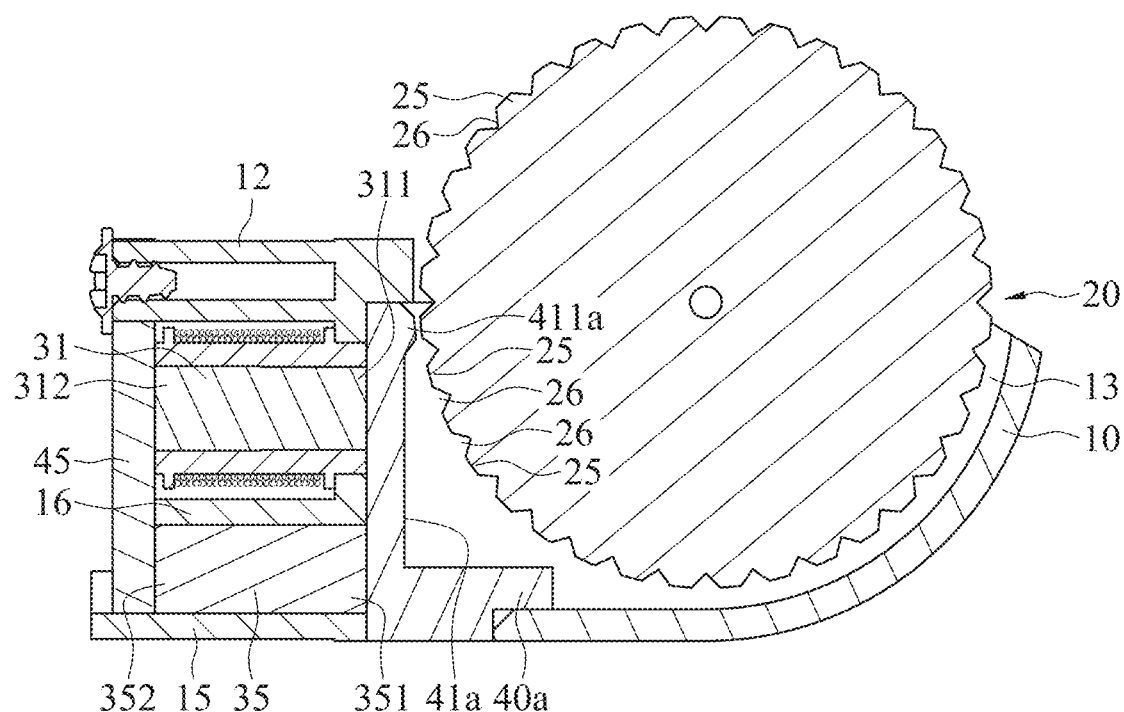
FIG. 9 illustrates a cross-sectional view of a roller input device according to a second embodiment of the instant disclosure.

As shown in FIG. 4 to FIG. 6, in this embodiment, the magnetic-conductive element 40 is detachably fixed in the groove 13 of the base 10. Therefore, the manufacturer or the user can optionally replace the magnetic-conductive element 40 with other magnetic-conductive element 40 having different shapes, so that the magnitudes of the magnetic attraction force between the magnetic-conductive element 40 and the roller 20 can be changed so as to change the resistance applied to the roller 20 upon the roller is rotating 20. For example, as shown in FIG. 6, in the first embodiment, the magnetic-conductive element 40 has a plurality of convex portions 411; when the electromagnet 31 is in the first mode, during the process that the user operates the roller 20 to rotate, the convex portions 411 respectively correspond to the magnetic protrusions 25 to generate a magnetic attraction force with a first magnitude. As shown in FIG. 9, in the second embodiment, the side surface 41a of the magnetic-conductive element 40a is a flat surface, and the magnetic-conductive element 40a comprises one convex portion 411a on the side surface 41a; when the electromagnet 31 is in the first mode, during the process that the user operates the roller 20 to rotate, the convex portion 411a only corresponds to one of the magnetic protrusions 25 to generate a magnetic attraction force with a second magnitude. Therefore, as compared with the first embodiment, the number of the convex portion 411a of the magnetic-conductive element 40a is reduced. Hence, the magnetic attraction force with the second magnitude is less than the magnitude attraction force with the first magnitude. Consequently, the manufacturer or the user can assemble the magnetic-conductive element 40 or the magnetic-conductive element 40a to adjust the operation feeling of the roller 20 freely.

As shown in FIG. 1, FIG. 2, and FIG. 4, in this embodiment, the roller input device 1 further comprises a toggle switch 60 adapted switch the electromagnet 31 between the first mode and the second mode. For example, the toggle switch 60 may be connected to the coil 32 of the electromagnet 31 through the microprocessor 71 of the circuit board 70. Therefore, the user can operate the toggle switch 60 through the microprocessor 71 to switch the coil 32 to conduct the forward current to allow the electromagnet 31 to be in the first mode or to switch the coil 32 to conduct the negative current to allow the electromagnet 31 to be in the second mode.

In some embodiments, the toggle switch 60 may be a physical switch (as shown in FIG. 1 and FIG. 2) and is electrically connected to the microprocessor 71. Alternatively, in some embodiments, the toggle switch 60 may be a virtual switch and is communicatively connected to the microprocessor 71. For example, the user can execute an application program through a user device (such as a computer, a smart phone, or a tablet computer) to show the virtual toggle switch 60 on the operation interface for operation.

Figure 10:
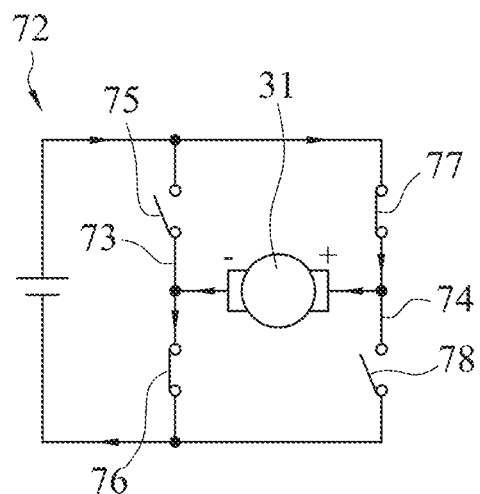
FIG. 10 illustrates a circuit diagram showing the electromagnet of the roller input device of the exemplary embodiment is switched to the first mode.
Figure 11:
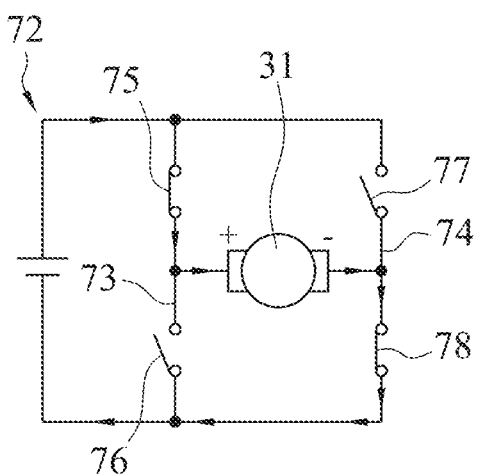
FIG. 11 illustrates a circuit diagram showing the electromagnet of the roller input device of the exemplary embodiment is switched to the second mode.

FIG. 10 illustrates a circuit diagram showing the electromagnet 31 of the roller input device 1 of the exemplary embodiment is switched to the first mode. FIG. 11 illustrates a circuit diagram showing the electromagnet 31 of the roller input device 1 of the exemplary embodiment is switched to the second mode. As shown in FIG. 10 and FIG. 11, in this embodiment, the electromagnet 31 can be electrically connected to a circuit 72, and the circuit 72 may be disposed on the circuit board 70. The circuit 72 comprises a first line 73, a second line 74, a first switch 75, a second switch 76, a third switch 77, and a fourth switch 78. The first line 73 and the second line 74 are connected in parallel, the electromagnet 31 is electrically connected between the first line 73 and the second line 74, the first switch 75 and the second switch 76 are configured on the first line 73, and the third switch 77 and the fourth switch 78 are configured on the second line 74. As shown in FIG. 10, when the user operates the toggle switch 60 to switch the electromagnet 31 to be in the first mode, the microprocessor 71 can control the first switch 75 and the fourth switch to be disconnected, so that the current flows to the coil 32 from one of two ends of the coil 32 of the electromagnet 31 through the second line 74, thus allowing the coil 32 to conduct the forward current. As shown in FIG. 11, when the user operates the toggle switch 60 to switch the electromagnet 31 to be in the second mode, the microprocessor 71 can control the second switch 76 and the third switch 77 to be disconnected, so that the current flows to the coil 32 from the other end of the coil 32 through the first line 73, thus allowing the coil 32 to conduct the reverse current. However, the foregoing embodiments are provided for illustrative purposes. In practical scenarios, the toggle switch 60 may be provided to switch the coil 32 of the electromagnet 31 to conduct the forward current or the negative current through other different circuits.

Moreover, as shown in FIG. 4 to FIG. 6, a mount 15 further extends from the side of the base 10, and the magnetic assembly 30 is fixed on the mount 15 and thus out of the base 10. For example, the magnetic assembly 30 may be fixed on the mount 15 through adhering, locking, engaging, gluing, or the like. In this embodiment, the side of the base 10 has an insertion groove 11, and one end of the electromagnet 31 is inserted and fixed into the insertion groove 11. Furthermore, an insulation seat is disposed on the mount 15, the insulation seat 16 has a receiving groove 161, the electromagnet 31 is fixed on the insulation seat 16, and the permanent magnet 35 is received in the receiving groove 161. Therefore, the electromagnet 31 can be prevented from directly contacting the permanent magnet 35.

Furthermore, as shown in FIG. 4 to FIG. 6, the roller input device 1 further comprises another magnetic-conductive element 45 fixed on the mount 15, and the two magnetic-conductive elements 40, 45 are respectively at two opposite ends of the magnetic assembly 30. A limiting post 12 further extends from the side of the base 10, and an end portion of the limiting post 12 is fixed on the magnetic-conductive element 45. In this embodiment, the magnetic-conductive element 45 may be a block or a plate made of iron, cobalt, nickel, silicon steel or other magnetic-conductive materials. Furthermore, a bottom portion of the magnetic-conductive element 45 is fixed on the mount 15, and the end portion of the limiting post 12 is locked to a top portion of the magnetic-conductive element 45 through a screw, so that a space is formed between the magnetic-conductive element 45, the mount 15, the base 10, and the limiting post 12. The magnetic assembly 30 is between the limiting post 12 and the mount 15 and thus is limited in the space, and the magnetic-conductive element 45 covers the receiving groove 161 of the insulation seat 16, so that both the electromagnet 31 and the permanent magnet 35 of the magnetic assembly 30 are limited and thus can be prevented from being detached off the mount 15.

Figure 12:
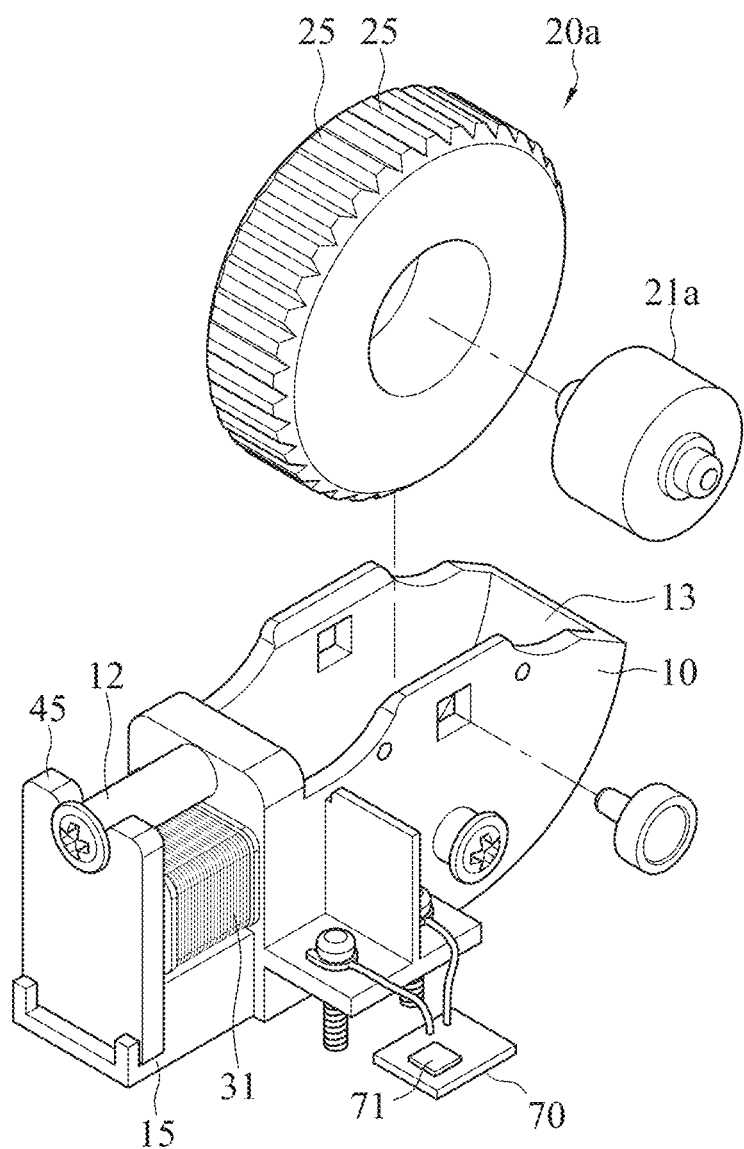
FIG. 12 illustrates a cross-sectional view of a roller input device according to a third embodiment of the instant disclosure.

FIG. 12 illustrates a cross-sectional view of a roller input device 1 according to a third embodiment of the instant disclosure. As shown in FIG. 12, the difference between the third embodiment and the first embodiment is at least the structure of the roller. In this embodiment, the roller 20a is a composite roller, the main body 21a of the roller 20a is made of a plastic material, and a plurality of magnetic protrusions 25 is arranged around a peripheral portion of the main body 21a, so that the entire roller 20a can be lightweight.

Figure 13:
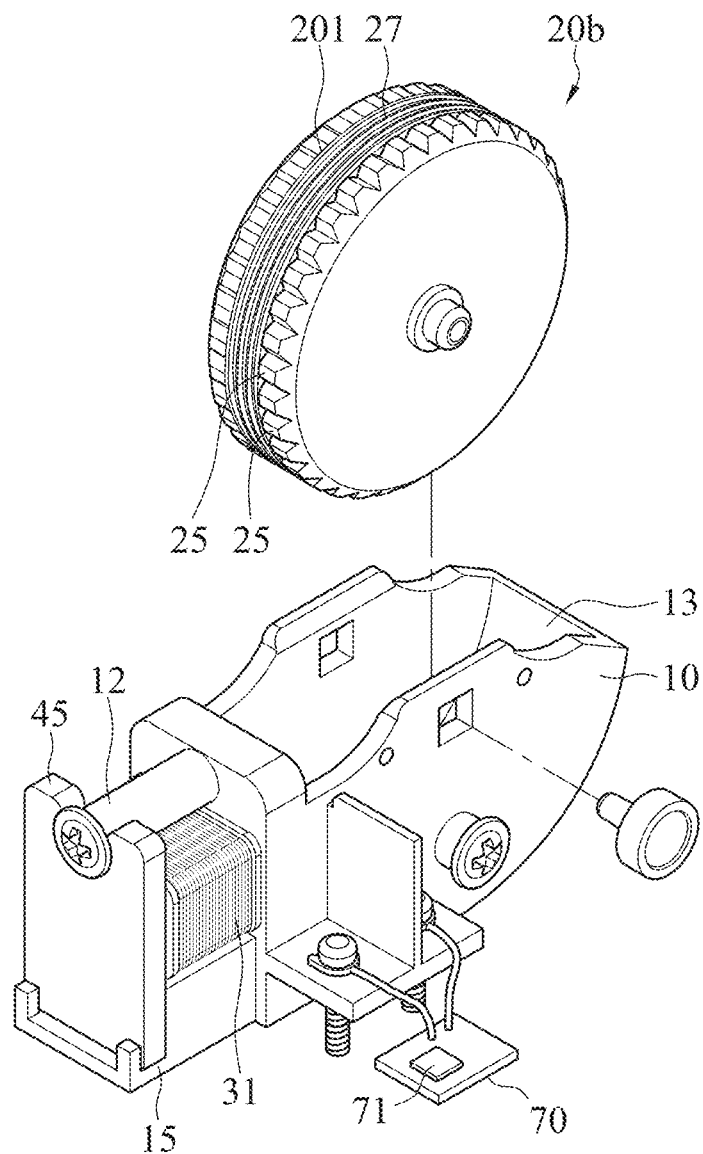
FIG. 13 illustrates a cross-sectional view of a roller input device according to a fourth embodiment of the instant disclosure.

FIG. 13 illustrates a cross-sectional view of a roller input device 1 according to a fourth embodiment of the instant disclosure. As shown in FIG. 13, the difference between the fourth embodiment and the first embodiment is at least the structure of the roller. In this embodiment, the peripheral portion of the main body of the roller 20a has a ring-shaped groove 201, and a ring-shaped washer 27 (such as a rubber washer or a silicone washer) is disposed in the ring-shaped groove 201. Therefore, through the configuration of the ring-shaped washer 27, the roller 20b can be protected and the comfort of the user during operating the roller 20b can be enhanced.

Based on the above, in the roller input device according to one or some embodiments of the instant disclosure, when the electromagnet is switched to the first mode, the coil conducts the forward current so that the magnetic-conductive element is magnetized to have a magnetic property. Therefore, a change of magnetic attraction forces can be provided between the magnetic-conductive element and the magnetic protrusions, and the user will have a stepped operation feeling upon rotating the roller. When the electromagnet is switched to the second mode, the coil conducts a reverse current so that the magnetic-conductive element does not have the magnetic property. Therefore, upon the user rotates the roller, the roller can be rotated quickly or can perform a finely operation without having an excessive resistance. Hence, according to one or some embodiments of the instant disclosure, the roller input device can be provided for meeting certain operation conditions (such as the user has to operate the roller for a long time or for a long distance, or the user has to allow the roller to perform a more finely scroll operation).

While the instant disclosure has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A roller input device comprising:
   a base;
   a roller rotatably disposed on the base, wherein the roller comprises a main body and a plurality of magnetic protrusions, the magnetic protrusions are arranged around a peripheral portion of the main body, and the magnetic protrusions are spaced apart from each other;
   a magnetic assembly disposed on one side of the base, wherein the magnetic assembly comprises an electromagnet and a permanent magnet stacked with the electromagnet; the electromagnet comprises a coil, a first magnetic pole, and a second magnetic pole opposite to the first magnetic pole, and the electromagnet is selectively switched between a first mode and a second mode; the permanent magnet comprises a third magnetic pole and a fourth magnetic pole opposite to the third magnetic pole; and
   a magnetic-conductive element disposed on the base, wherein the magnetic-conductive element is between the roller and the magnetic assembly, and the first magnetic pole of the electromagnet and the third magnetic pole of the permanent magnet are adjacent to the magnetic-conductive element; the magnetic-conductive element has a side surface facing the roller, the side surface has a convex portion, and the convex portion is adjacent to an outer periphery of the roller but does not contact the magnetic protrusions;

wherein when the electromagnet is in the first mode, the coil conducts a forward current, so that the magnetic-conductive element is magnetized to have a magnetic property; when the electromagnet is in the second mode, the coil conducts a reverse current, so that the magnetic-conductive element does not have the magnetic property.

2. The roller input device according to claim 1, wherein when the electromagnet is in the first mode, the first magnetic pole and the third magnetic pole are poles with a same polarity, and the second magnetic pole and the fourth magnetic pole are poles with a same polarity; when the electromagnet is in the second mode, the first magnetic pole and the third magnetic pole are poles with opposite polarities, and the second magnetic pole and the fourth magnetic pole are poles with opposite polarities.

3. The roller input device according to claim 1, wherein a notch is between each two adjacent magnetic protrusions among the magnetic protrusions; when the electromagnet is in the first mode and a position of the convex portion corresponds to a corresponding one of the magnetic protrusions, a magnetic attraction force is between the convex portion and the corresponding one of the magnetic protrusions; when the electromagnet is in the first mode and the position of the convex portion corresponds to the notch, the magnetic attraction force is not between the convex portion and each of the magnetic protrusions.

4. The roller input device according to claim 1, further comprising a control switch, wherein the control switch is connected to the electromagnet; when the electromagnet is in the first mode, the control switch is capable of optionally adjusting a magnitude of the forward current.

5. The roller input device according to claim 1, further comprising a toggle switch, wherein the toggle switch is connected to the electromagnet, and the toggle switch is capable of selectively toggling the coil to conduct the forward current or the reverse current.

6. The roller input device according to claim 1, wherein the side surface of the magnetic-conductive element is an arced surface, the side surface of the magnetic-conductive element comprises a plurality of the convex portions, and the convex portions are spaced apart from each other.

7. The roller input device according to claim 1, wherein a mount extends from the side of the base, and the magnetic assembly is fixed on the mount.

8. The roller input device according to claim 7, wherein an insertion groove is at the side of the base, and one end of the electromagnet is inserted and fixed into the insertion groove.

9. The roller input device according to claim 7, wherein an insulation seat is disposed on the mount, the insulation seat has a receiving groove, the electromagnet is fixed on the insulation seat, and the permanent magnet is received in the receiving groove.

10. The roller input device according to claim 7, further comprising another magnetic-conductive element, wherein the another magnetic-conductive element is fixed on the mount, and the magnetic-conductive element and the another magnetic-conductive element are respectively at two opposite ends of the magnetic assembly.

11. The roller input device according to claim 10, wherein a limiting post further extends from the side of the base, an end portion of the limiting post is fixed on the another magnetic-conductive element, and the magnetic assembly is between the limiting post and the mount.

12. The roller input device according to claim 1, wherein the peripheral portion of the main body of the roller has a ring-shaped groove, and a ring-shaped washer is disposed in the ring-shaped groove.

13. The roller input device according to claim 1, wherein the base has a groove, the magnetic-conductive element is detachably fixed in the groove, and a portion of the roller is in the groove.

14. The roller input device according to claim 1, where the main body is made of a plastic material.

* * * * *